(12) United States Patent
Yu

(10) Patent No.: US 11,991,244 B2
(45) Date of Patent: May 21, 2024

(54) COLLABORATIVE APPLICATION SERVICE PROCESS MANAGEMENT SYSTEM AND METHOD BASED ON MULTI-TENANT MODE

(71) Applicant: Huzhou Newt Network Technology Co., Ltd., Huzhou (CN)

(72) Inventor: Yun Yu, Huzhou (CN)

(73) Assignee: Huzhou Newt Network Technology Co., Ltd. (CN)

( * ) Notice: Subject to any disclaimer, the term of this patent is extended or adjusted under 35 U.S.C. 154(b) by 0 days.

(21) Appl. No.: 18/373,150

(22) Filed: Sep. 26, 2023

(65) Prior Publication Data
US 2024/0137412 A1 Apr. 25, 2024

(30) Foreign Application Priority Data
Oct. 19, 2022 (CN) .......................... 202211281159.6

(51) Int. Cl.
*G06F 15/16* (2006.01)
*H04L 9/40* (2022.01)
*H04L 67/1074* (2022.01)
(52) U.S. Cl.
CPC ........ *H04L 67/1074* (2013.01); *H04L 63/101* (2013.01); *H04L 63/102* (2013.01)

(58) Field of Classification Search
None
See application file for complete search history.

(56) References Cited

U.S. PATENT DOCUMENTS

2020/0201689 A1* 6/2020 Laethem ................. G06F 9/451

* cited by examiner

*Primary Examiner* — Wing F Chan
*Assistant Examiner* — Andrew Woo
(74) *Attorney, Agent, or Firm* — James W. Huffman; Huffman Law Group, PC

(57) ABSTRACT

Provided is a collaborative application service process management system based on a multi-tenant mode in an embodiment of the present disclosure. The system includes an application module, an application service process phase module, an application service process phase state module, an application object module, a collaborative application object management module, an application permission module, an application service process re-combiner, a shared database, etc. According to the method, a service process satisfying multi-scenario requirements can be designed in combination with an actual application scenario, and multi-scenario services in one application can be collaboratively managed. Therefore, system switch between different scenarios by a tenant is reduced, an inter-tenant collaborative management capacity is improved, and a tenant-application multi-scenario management capacity is improved.

15 Claims, 7 Drawing Sheets

COLLABORATIVE APPLICATION SERVICE PROCESS MANAGEMENT SYSTEM AND METHOD BASED ON MULTI-TENANT MODE

CROSS REFERENCE TO RELATED APPLICATION

This patent application claims the benefit and priority of Chinese Patent Application No. 202211281159.6, filed with the China National Intellectual Property Administration on Oct. 19, 2022, the disclosure of which is incorporated by reference herein in its entirety as part of the present application.

TECHNICAL FIELD

The present disclosure relates to the technical field of collaborative service process management, and in particular to a collaborative application service process management system and method based on a multi-tenant mode.

BACKGROUND

Multi-scenario collaborative service application management, a type of information-interactive management method, aims for a beneficial purpose with a number of users participating in a multi-service scenario simultaneously and cooperating. In a software-as-a-service (SaaS) mode, i.e. an Internet based software provision mode, users stop purchasing software separately, but start to rent web based software from software providers to manage their internal operation activities without maintaining the software. Relying on a multi-tenant technology, the core of SaaS, services are offered to multiple tenants simultaneously based on a set of software system. A multi-scenario service of a system application instance is individually customized while multiple tenants share a system instance. Also, individual data are isolated while some data are shared between system applications.

With SaaS developing, multi-scenario collaborative service management is also offered to tenants as a software service. In the case of multi-scenario collaborative service management in an SaaS mode, a tenant-application multi-scenario service process must be customized and re-combined. Based on a multi-scenario based service process customization method, services of the same type are classified, and services of different types should be further classified into service states of different types. Accordingly, tenants can set service types according to their own application scenarios, name, classify, and set service requirement phases, and then name, classify, and set various service phase states following each service phase. Service phase classification and service phase state classification face constraints. Rational addition, modification, and deletion can be made within a limited constraint condition range. A complete multi-scenario collaboratively-managed service process can be offered to users after customization. Multi-scenario service process information following an application is acquirable from shared data through an application service process re-combiner. The re-combiner can output re-combined information to a web service for tenants to use by identifying, determining, and re-combining classified information and set information in a service phase, and then acquiring service phase state information bound to a current service phase. In this mode, users can rapidly formulate multi-scenario service processes and verify correctness, rationality, feasibility, and validity of re-combined multi-scenario service processes at any time. Thus, the user experience is significantly improved.

However, the inventor has found that it is common practice to offer a user a single-scenario service process and a module based modeled service process form for selection or collaboratively advance a process step by step through a variable-point based service customization method during conventional service process customization, which can actualize collaborative management. However, it is still defective for multi-scenario collaborative service management. For example, dozens of operation pages, complex service operation processes, and additional service system switch for multi-scenario services are involved, leading to an undesirable overall collaborative effect. Moreover, for a multi-scenario service process, users have to collaboratively advance the service synchronously or asynchronously until an entire service process is completed.

SUMMARY

In view of that, an objective of the present disclosure is to provide a collaborative application service process management system and method based on a multi-tenant mode, and therefore problems of current service process complexity and operation inconvenience are solved.

Based on the above objective, the present disclosure provides a collaborative application service process management system based on a multi-tenant mode. The system includes an application module, an application service process phase module, an application service process phase state module, an application object module, a collaborative application object management module, an application permission module, an application service process re-combiner, and a shared database, where the application module is configured to construct a tenant-application model and save a constructed tenant-application model as a form identifier WxappId into application data of the shared database;

the application service process phase module is configured to design a multi-scenario service process model, process a service phase, construct the service phase and a service phase process instance, and save a designed service process phase as a form identifier SchedulesetId into the application data of the shared database;

the application service process phase state module is configured to design a service phase state model, process a service phase state, construct the service phase state and a service phase state instance, and save a designed service phase state as a form identifier SchedulesetValueId into state data of the shared database;

the application object module is configured to construct and manage a service object and save the service object as a form identifier OrderId into an application object table of the shared database;

the collaborative application object management module is configured to collaboratively manage construction and change of the service object and service phase state data information, assign the service object and the service phase state data information in a form of a data set according to different service scenarios, and save the service object and the service phase state data information into different types of service data of the shared database;

the application permission module is configured to manage a tenant-application relation and save tenant-application permission data into application-tenant relation data of the shared database, and further manage an inter-application relation and save inter-application permission data into application permission data of the shared database;

the application service process re-combiner is configured to acquire service phases and service phase state data in different scenarios from the shared database and output re-combined service phases and service phase state data in a form of a data stream to a web end, and further acquire service data of service phases and service phase states in different scenarios from shared data and output re-combined service date in a form of a data stream to the web end; and the shared database is configured to store the application data, phase data, phase state data, the application-tenant relation data, object data, the application permission data, the service data, and tenant data.

As an alternative implementation, the service process re-combiner is further configured to acquire service phases according to a current application identifier, classify the service phases according to a service phase type, and output application service names in sequence based on service sequencing.

As an alternative implementation, the service process re-combiner is further configured to acquire the service phases according to the current application identifier, classify the service phases according to the service phase type, generate a service identifier sequence based on service sequencing, acquire a phase state identifier corresponding to a phase identifier from service data of service phase identifiers in a circulation manner according to a service object identifier, acquire a phase state name by matching the phase state identifier, and re-combine acquired data after circulation is ended to obtain a service object and current phase state information of each phase.

As a second aspect of the present disclosure, a collaborative application service process management method based on a multi-tenant mode is provided. The collaborative application service process management method is applied to the above collaborative application service process management system and includes:

performing requirement analysis on a current application service process phase, constructing a service phase in a required service phase sequence, and saving the service phase in a form of a natural language into a shared database;

re-analyzing a possible phase state in the current application service process phase and saving a possible state result in a form of a natural language into shared data;

setting application-tenant permission and saving application-tenant operation permission into the shared database after setting;

setting inter-application permission and opening data permission between applications, so that a tenant under the application has permission to inquire other unrelated applications and view object data through collaborative application object management; and re-combining a process and data of a service phase through a service process re-combiner and a service data re-combiner respectively, so that a service process is customized and service data are monitored in different scenarios.

As a second aspect of the present disclosure, the performing requirement analysis on a current application service process phase, constructing a service phase in a required service phase sequence, and saving the service phase in a form of a natural language into a shared database include:

describing a phase name in a suitable natural language according to an actual service when a service process phase is set and then selecting a suitable service phase type as required to construct the service phase.

As an alternative implementation, the re-analyzing a possible phase state in the current application service process phase and saving a possible state result in a form of a natural language into shared data include:

describing a phase state name in a suitable natural language according to an actual phase state when a service phase state is set and then selecting a suitable phase state type as required to construct a service state.

As an alternative implementation, the setting application-tenant permission and saving application-tenant operation permission into the shared database after setting include:

assigning operation permission to other tenants as required to enable the tenants to cooperate with one another.

The present disclosure has the beneficial effects as follows: the present disclosure provides a collaborative application service process management system and method based on a multi-tenant mode. The system includes the application module, the application service process phase module, the application service process phase state module, the application object module, the collaborative application object management module, the application permission module, the application service process re-combiner, the shared database, etc. According to the method, a service process satisfying multi-scenario requirements can be designed in combination with an actual application scenario, and a multi-scenario service in one application can be collaboratively managed. Therefore, system switch between different scenarios by a tenant is reduced, an inter-tenant collaborative management capacity is improved, a tenant-application multi-scenario management capacity is improved, and the setting flexibility of the system for a complex-scenario application is improved. Since applications of different tenants are executed in the same system and can authorize one another, and application object information between application scenarios can mutually communicate, an information interaction capacity in a tenant-application scenario can be effectively improved, and an inter-tenant operation cost is significantly reduced.

BRIEF DESCRIPTION OF THE DRAWINGS

In order to describe the technical solutions in the present disclosure or in the prior art more clearly, the accompanying drawings required for describing embodiments or the prior art are briefly described below. Apparently, the accompanying drawings in the following description show merely the present disclosure. Those of ordinary skill in the art can still derive other accompanying drawings from these accompanying drawings without creative efforts.

DETAILED DESCRIPTION OF THE EMBODIMENTS

In order to make the objectives, technical solutions, and advantages of the present disclosure clearer, the present disclosure is further described in detail below with reference to specific embodiments.

It should be noted that unless otherwise defined, technical or scientific terms used in the present disclosure should have ordinary meanings understood by those of ordinary skill in the art to which the present disclosure belongs. Words "first", "second", etc. used in the present disclosure do not denote any sequence, number, or importance, but are merely used to distinguish between different components. Words "comprise", "include", "encompass", etc. mean that elements or items before the word encompass elements or items listed after the word and their equivalents, but do not exclude other elements or items. Words "connection", "connected", etc. are not restricted to physical or mechanical connections, but can include electrical connections that are direct or indirect. "Upper", "lower", "left", "right", etc. are merely used to indicate a relative position relation, which may also change accordingly when an absolute position of a described object changes.

Figure 1:
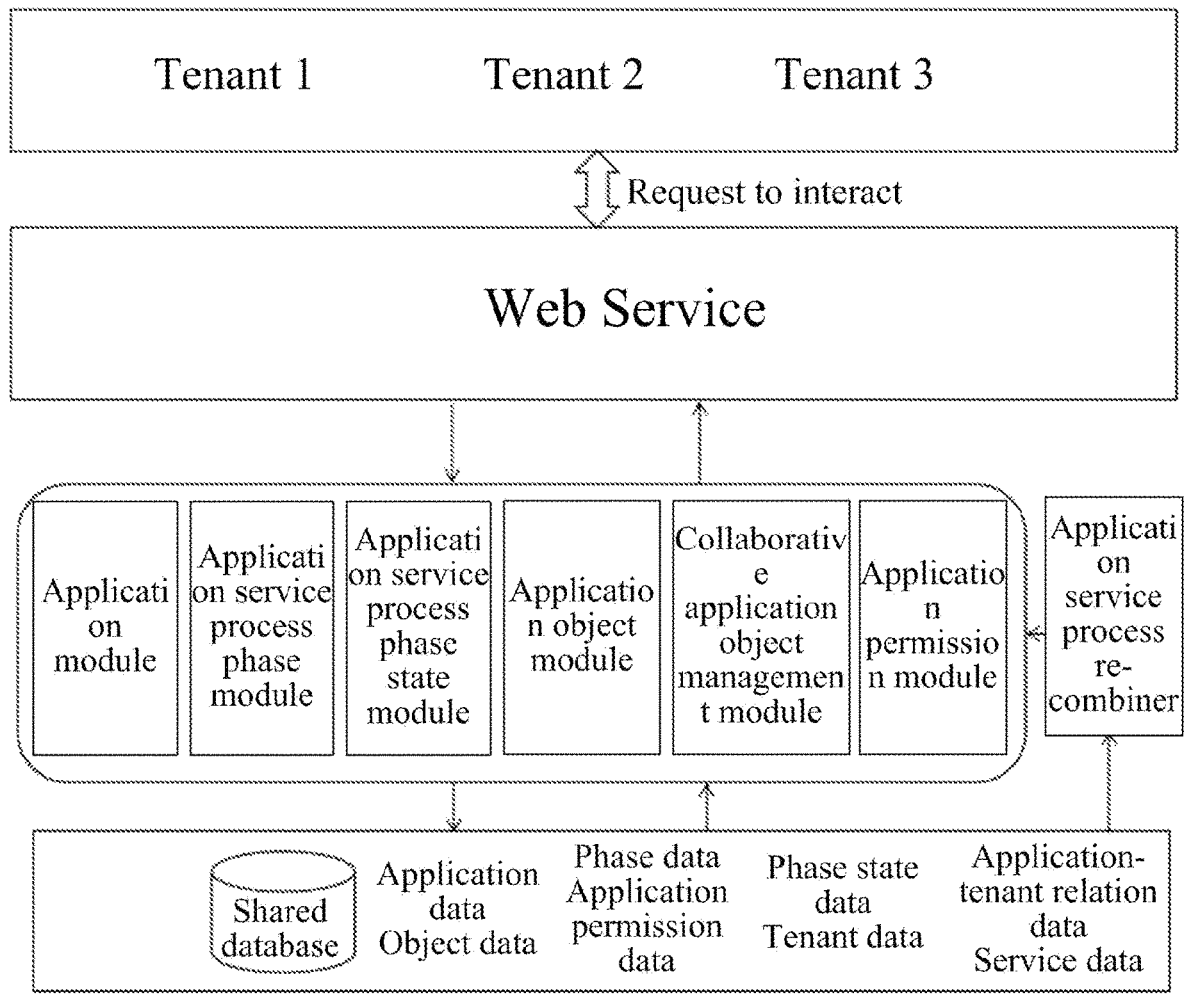
FIG. 1 is a schematic diagram of a collaborative application service process management system based on a multi-tenant mode in an embodiment of the present disclosure.

As an embodiment of the present disclosure, as shown in FIG. 1, a collaborative application service process management system based on a multi-tenant mode is provided. The system includes an application module, an application service process phase module, an application service process phase state module, an application object module, a collaborative application object management module, an application permission module, an application service process re-combiner, and a shared database, where the application module is configured to construct a tenant-application model and save a constructed tenant-application model as a form identifier (ID) WxappId into application data of the shared database;

the application service process phase module is configured to design a multi-scenario service process model, process a service phase, construct the service phase and a service phase process instance, and save a designed service process phase as a form identifier SchedulesetId into the application data of the shared database;

the application service process phase state module is configured to design a service phase state model, process a service phase state, construct the service phase state and a service phase state instance, and save a designed service phase state as a form identifier SchedulesetValueId into state data of the shared database;

the application object module is configured to construct and manage a service object and save the service object as a form identifier OrderId into an application object table of the shared database;

the collaborative application object management module is configured to collaboratively manage construction and change of the service object and service phase state data information, assign the service object and the service phase state data information in a form of a data set according to different service scenarios, and save the service object and the service phase state data information into different types of service data of the shared database;

the application permission module is configured to manage a tenant-application relation and save tenant-application permission data into application-tenant relation data of the shared database, and further manage an inter-application relation and save inter-application permission data into application permission data of the shared database;

the application service process re-combiner is configured to acquire service phases and service phase state data in different scenarios from the shared database and output re-combined service phases and service phase state data in a form of a data stream to a web end, and further acquire service data of service phases and service phase states in different scenarios from shared data and output re-combined service date in a form of a data stream to the web end; and the shared database is configured to store the application data, phase data, phase state data, the application-tenant relation data, object data, the application permission data, the service data, and tenant data.

A collaborative application service process management system based on a multi-tenant mode is provided in the embodiment of the present disclosure. The system includes the application module, the application service process phase module, the application service process phase state module, the application object module, the collaborative application object management module, the application permission module, the application service process re-combiner, the shared database, etc. According to the method, a service process satisfying multi-scenario requirements can be designed in combination with an actual application scenario, and a multi-scenario service in one application can be collaboratively managed. Therefore, system switch between different scenarios by a tenant is reduced, an inter-tenant collaborative management capacity is improved, a tenant-application multi-scenario management capacity is improved, and the setting flexibility of the system for a complex-scenario application is improved. Since applications of different tenants are executed in the same system and can authorize one another, and application object information between application scenarios can mutually communicate, an information interaction capacity in a tenant-application scenario can be effectively improved, and an inter-tenant operation cost is significantly reduced.

Preferably, description information of an application model designed through the application object module includes an application identifier, an application type, and a tenant identifier.

Figure 2:
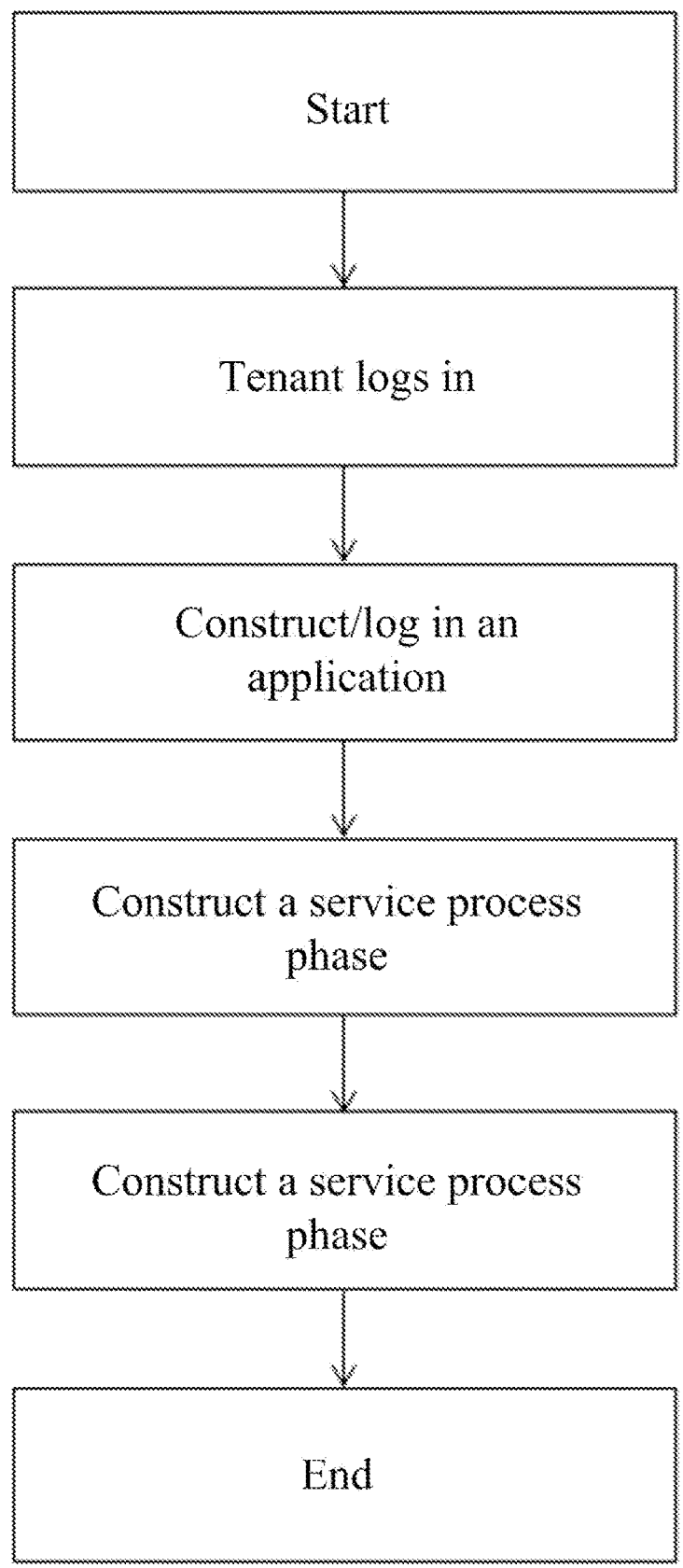
FIG. 2 is a flowchart of an application service in an embodiment of the present disclosure.

Preferably, as shown in FIG. 2, description information of a phase model of the application service process phase module includes a service phase identifier, a phase name, a phase service type, a phase state, a phase sequence, and an application identifier.

Preferably, the service types are pre-set as actually required, including: type 1 (user-defined monitoring), and type 2 (personnel monitoring), for example.

Preferably, description information of a phase state model of the application service process phase state module includes a service phase state identifier, a service phase identifier, a phase state name, a service phase state type, a phase state sequence, and an application identifier.

Preferably, the service phase state types are pre-set as actually required, including: type a (monitoring-state), type b (personnel-personnel list), and type c (monitoring-data), for example.

Preferably, a first effective phase state in the service phase is set as default service phase state information.

Preferably, description information of a service object model of the application object module includes a service object identifier, a service object name, a service object construction time, and an application identifier.

Figure 3:
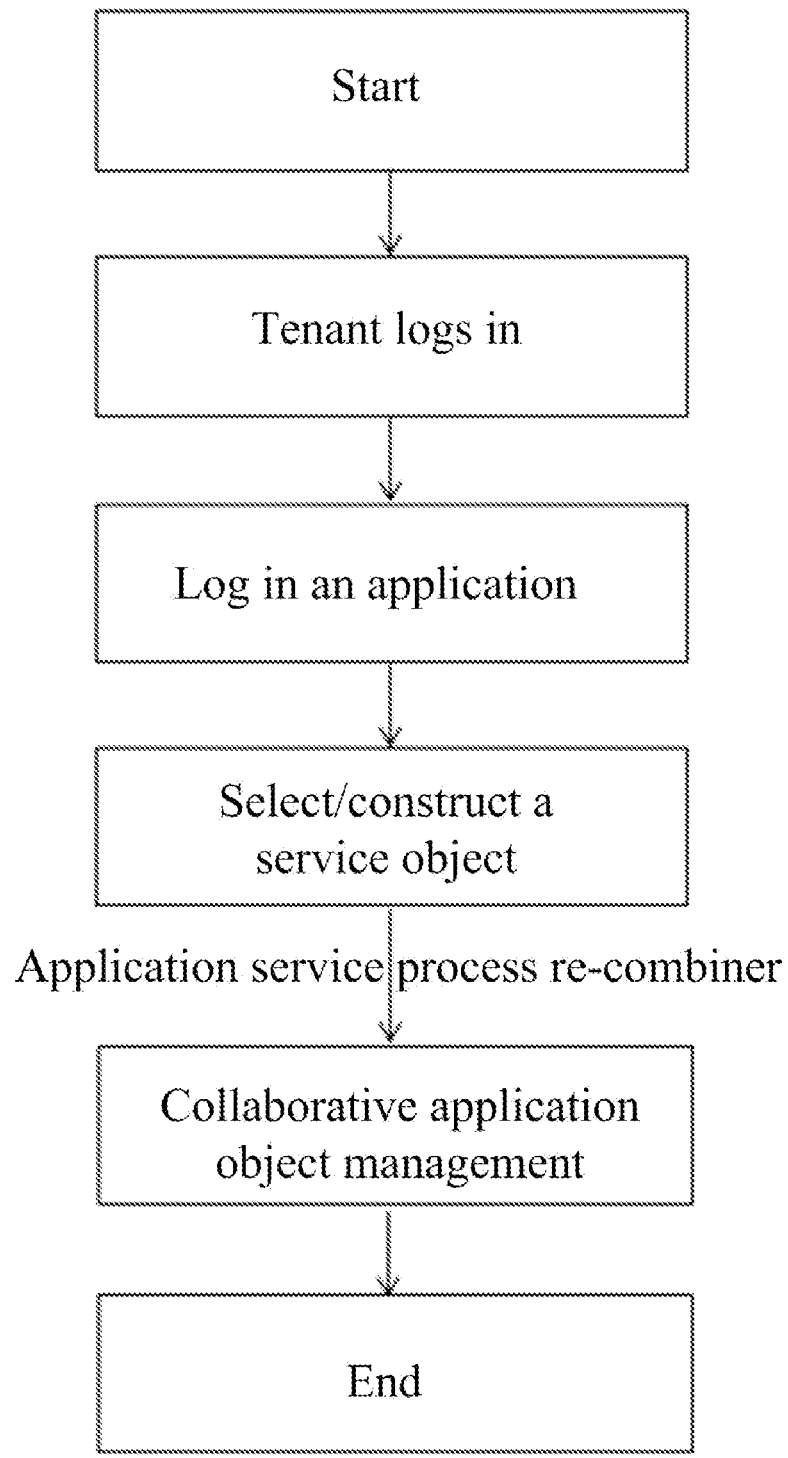
FIG. 3 is a flowchart of collaborative application object management in an embodiment of the present disclosure.

Preferably, as shown in FIG. 3, description information of a service data model of the collaborative application object management module includes a service data identifier, an object identifier, a phase identifier, a phase state identifier, a data content, an application identifier, a tenant identifier, a construction time, and an update time.

Preferably, description information of an application-tenant data model of the application permission module includes a permission id, an application identifier, a tenant identifier, permission data, and a construction date.

Preferably, description information an inter-application data model of the application permission module includes a permission id, an application identifier, an authorized application identifier, permission data, and a construction date.

Preferably, the application service process re-combiners include: a service process re-combiner and a service data re-combiner.

The service process re-combiner is configured to acquire service phases according to a current application identifier, classify the service phases according to a service phase type, and output application service names in sequence based on service sequencing to tenants.

As an alternative implementation, the service process re-combiner is further configured to acquire service phases according to a current application identifier, classify the service phases according to a service phase type, and output application service names in sequence based on service sequencing.

As an alternative implementation, the service process re-combiner is further configured to acquire the service phases according to the current application identifier, classify the service phases according to the service phase type, generate a service identifier sequence based on service sequencing, acquire a phase state identifier corresponding to a phase identifier from service data of service phase identifiers in a circulation manner according to a service object identifier, acquire a phase state name by matching the phase state identifier, and re-combine acquired data after circulation is ended to obtain a service object and current phase state information of each phase.

The present disclosure further provides a collaborative application service process management method based on a multi-tenant mode corresponding to the system. The collaborative application service process management method is applied to the above collaborative application service process management system and includes:

S100, requirement analysis is performed on a current application service process phase, a service phase is constructed in a required service phase sequence, and the service phase in a form of a natural language is saved into a shared database;

S200, a possible phase state in the current application service process phase is re-analyzed, and a possible state result in a form of a natural language is saved into shared data;

S300, application-tenant permission is set, and application-tenant operation permission is saved into the shared database after setting;

S400, inter-application permission is set, and data permission is opened between applications, so that a tenant under the application has permission to inquire other unrelated applications and view object data through collaborative application object management; and S500, a process and data of a service phase are re-combined through a service process re-combiner and a service data re-combiner respectively, so that a service process is customized and service data are monitored in different scenarios.

As an alternative implementation, the step that requirement analysis is performed on a current application service process phase, a service phase is constructed in a required service phase sequence, and the service phase in a form of a natural language is saved into a shared database includes: a phase name is described in a suitable natural language according to an actual service when a service process phase is set, and then a suitable service phase type is selected as required to construct the service phase. The application and the service phase are in a one-to-many relation, and the tenant can set various service phases.

As an alternative implementation, the step that a possible phase state in the current application service process phase is re-analyzed, and a possible state result in a form of a natural language is saved into shared data includes: a phase state name is described in a suitable natural language according to an actual phase state when a service phase state is set, and then a suitable phase state type is selected as required to construct a service state. The service phase and the service phase state are in a one-to-many relation.

Figure 4:
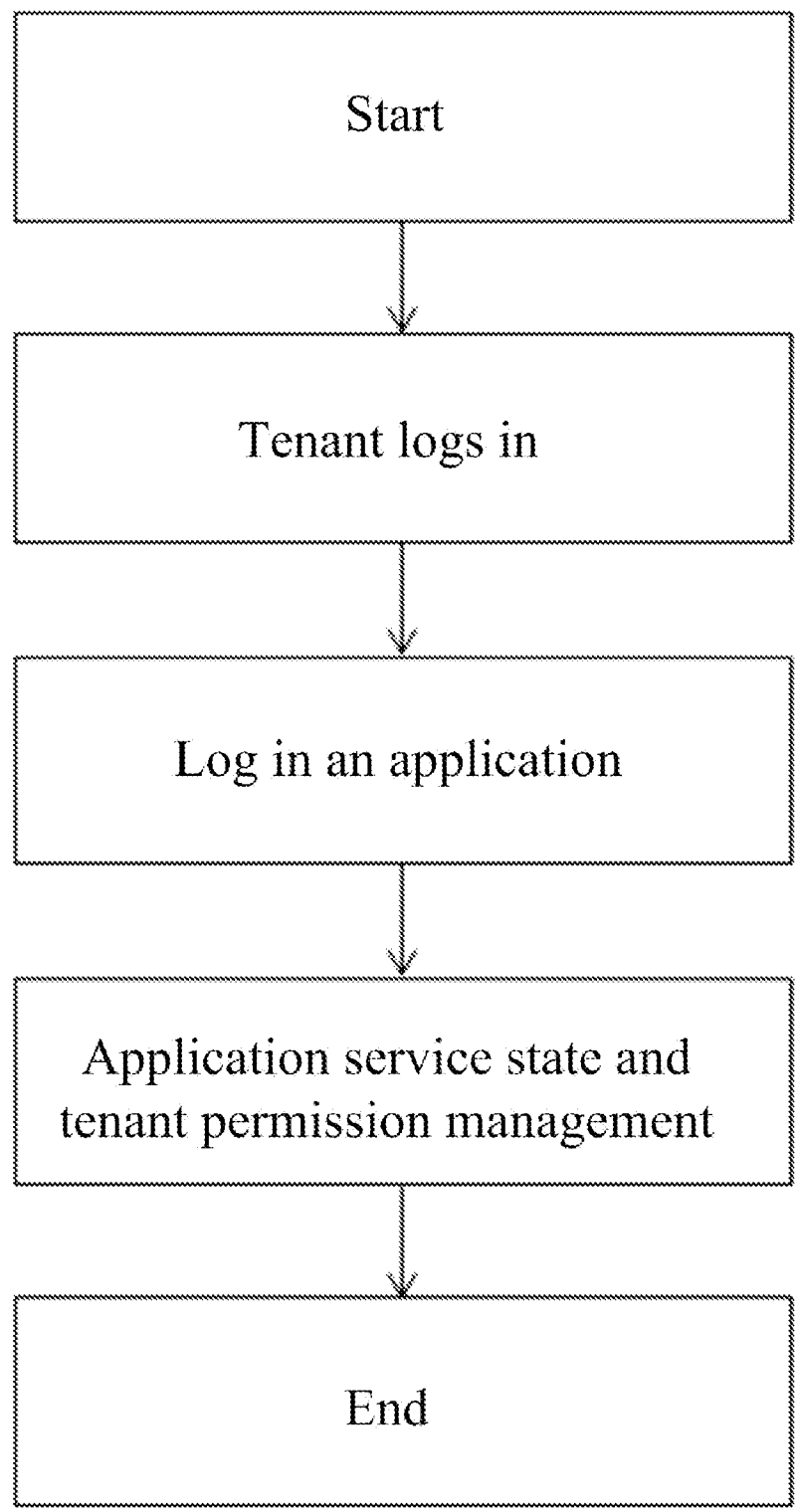
FIG. 4 is a flowchart of an application service state and tenant permission management in an embodiment of the present disclosure.

As an alternative implementation, as shown in FIG. 4, the step that application-tenant permission is set, and application-tenant operation permission is saved into the shared database after setting include: operation permission is assigned to other tenants as required to enable the tenants to cooperate with one another.

Figure 5:
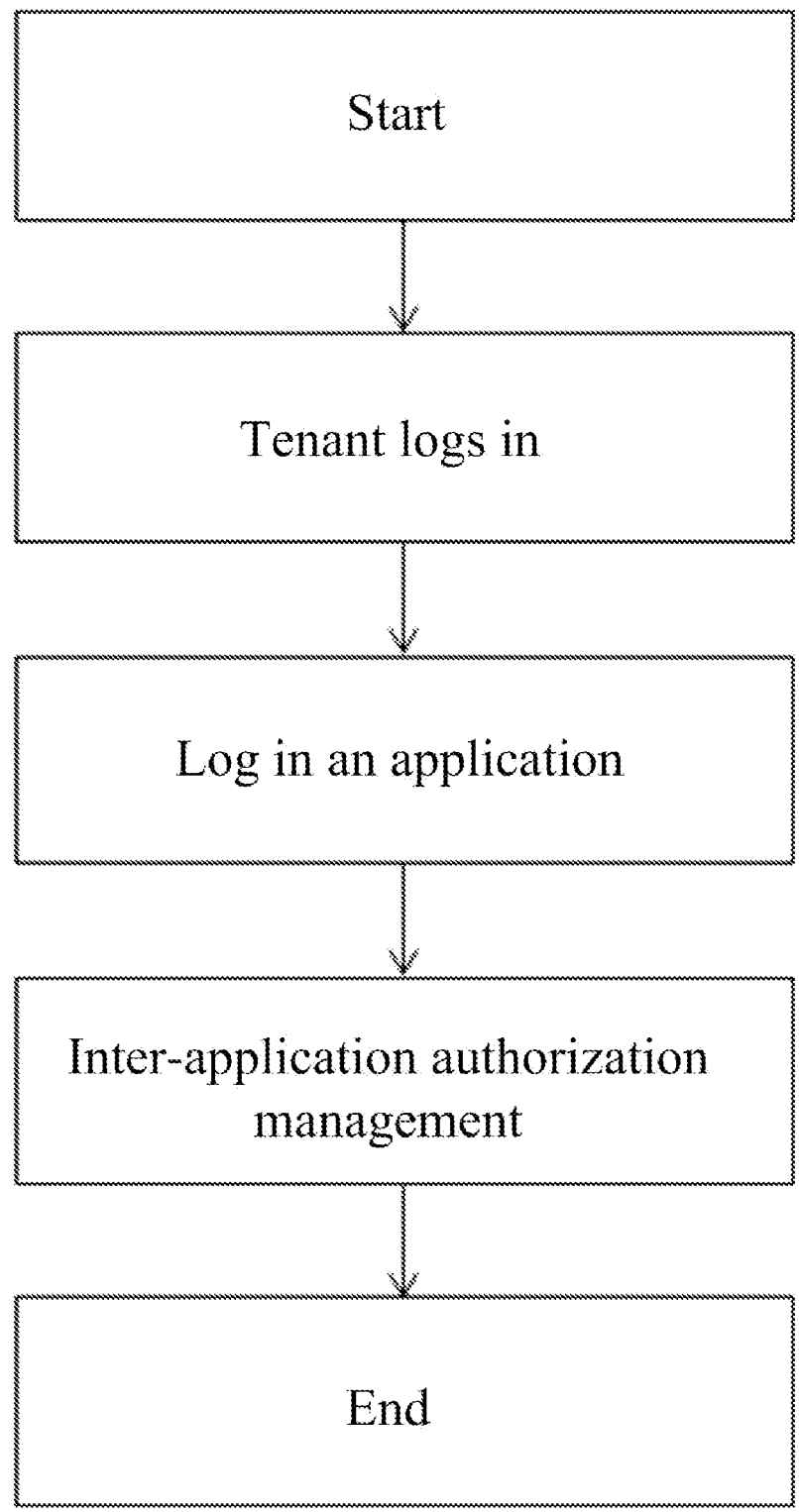
FIG. 5 is a flowchart of inter-application authorization management in an embodiment of the present disclosure.

Preferably, as shown in FIG. 5, the step that inter-application permission is set, and data permission is opened between applications, so that a tenant under the application has permission to inquire other unrelated applications and view object data through collaborative application object management includes: different application object authorization relations are set between the applications as actually required, so that better inter-application data privacy and data collaboration can be realized.

Preferably, in different application scenarios, retrieval is performed as required only according to the service phase types corresponding to the scenarios and the corresponding service phase state types. Accordingly, the service pressure is effectively reduced, a data computation speed is increased, and an operation cost of a service provider is reduced.

EMBODIMENT

In order to describe the present disclosure more clearly, the particular implementations of the present disclosure will be further described in detail below with reference to the accompanying drawings in the embodiments.

1. A tenant constructs an application/logs in an application, where an application name is Newt Happy, and an application type is a production management system.

2. Application-tenant permission is set.

3. Inter-application permission is set.

4. The tenant analyzes a phase name involved in a service process phase according to current multi-scenario application service requirements, and selects a suitable service type according to a phase feature; whether the tenant has permission is determined; if not, the operation is ended; and if yes, the tenant sets the phase name as follows: fabric purchase, auxiliary material purchase, production cutting bed, production processing, warehousing personnel, and finished product warehousing; where user-defined monitoring type phases are as follows: fabric purchase, auxiliary material purchase, production cutting bed, production processing, and finished product warehousing, and monitoring personnel type phase is as follows: warehousing personnel.

4.1. According to the service analysis in 4 in combination with an actual service phase state of a scenario, the fabric purchase is set as follows: unpurchased and purchased.

4.2. According to the service analysis in 4 in combination with the actual service phase state of the scenario, the auxiliary material purchase is set as follows: unpurchased and purchased.

4.3. According to the service analysis in 4 in combination with the actual service phase state of the scenario, the production cutting bed is set as follows: uncut, cutting quantity, and cut, where a phase state type of the cutting quantity is monitoring-data.

4.4. According to the service analysis in 4 in combination with the actual service phase state of the scenario, the production processing is set as follows: unprocessed, delivered quantity, and completed, where a phase state type of the delivered quantity is monitoring-data.

4.5. According to the service analysis in 4 in combination with the actual service phase state of the scenario, the warehousing personnel are set as follows: Zhang San and Li Si, where a phase state type of the service phase is monitoring-personnel.

4.6 According to the service analysis in 4 in combination with the actual service phase state of the scenario, the finished product warehousing is set as follows: undelivered, warehousing quantity, and warehousing completed, where a phase state type of the warehousing quantity is monitoring-data.

4.7. Phase state types not specifically described in steps 4.1-4.6 are monitoring-state, where an ascending sequence from front to back is employed.

5. A user activates collaborative application object service process management; a system acquires service process phase data, service phase state data, service data, and application service object data from a database through a service process re-combiner when the user initiates entire production monitoring; service phases are output according to monitoring data phase names (in a data phase state sequence) and monitoring personnel/monitoring state names (in a service phase state sequence); and scenario data are acquired according to a service object, a service phase id, an application id, and a phase state id, and output to the user for viewing.

5.1. In an instance, the collaborative application object service process management offers inter-tenant progress summary view, cross-application data summary view, a multi-scenario phase type operation method, and a multi-scenario phase state change operation method.

Figure 6:
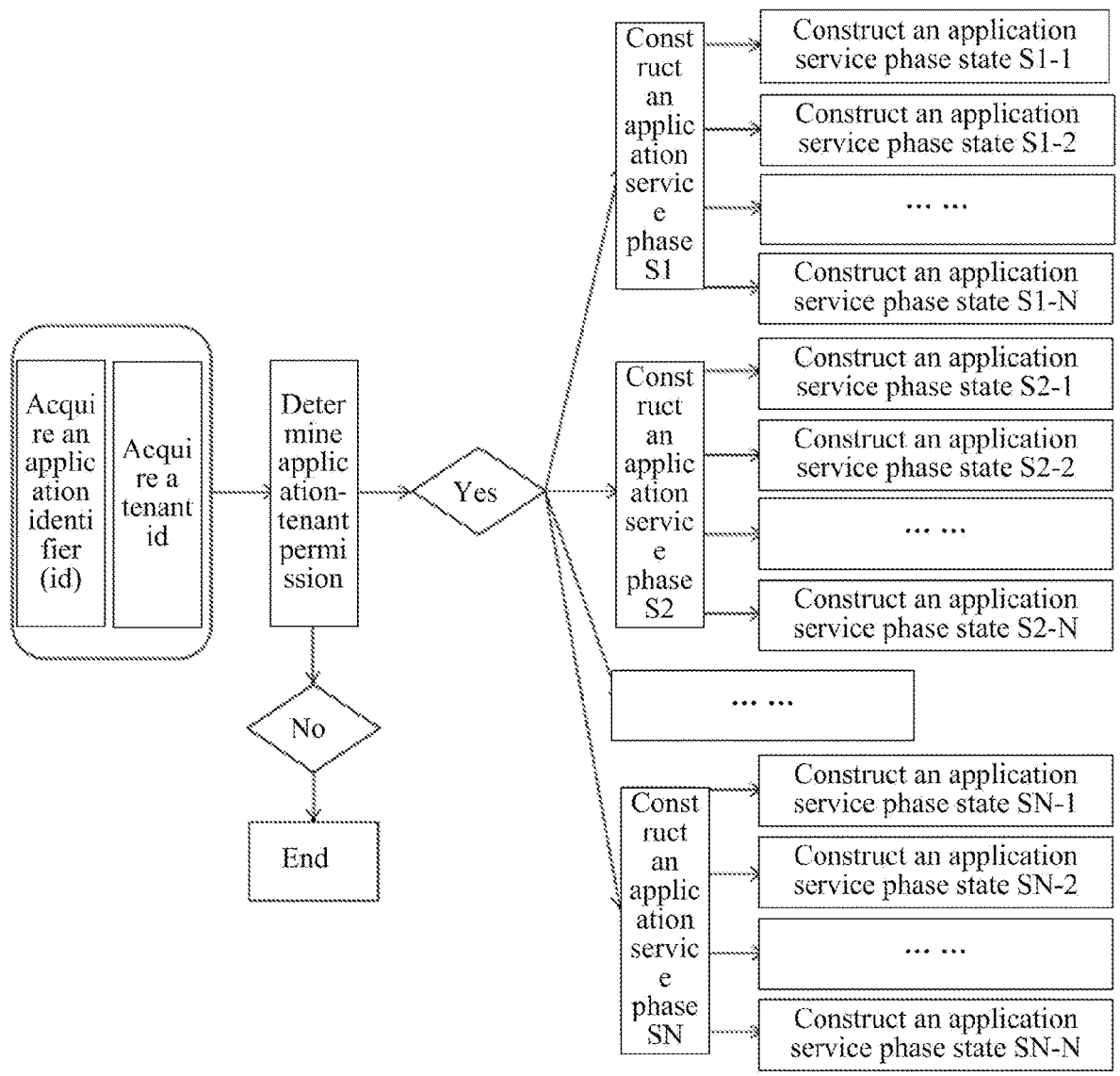
FIG. 6 is a model diagram of application service process customization in an embodiment of the present disclosure.
Figure 7:
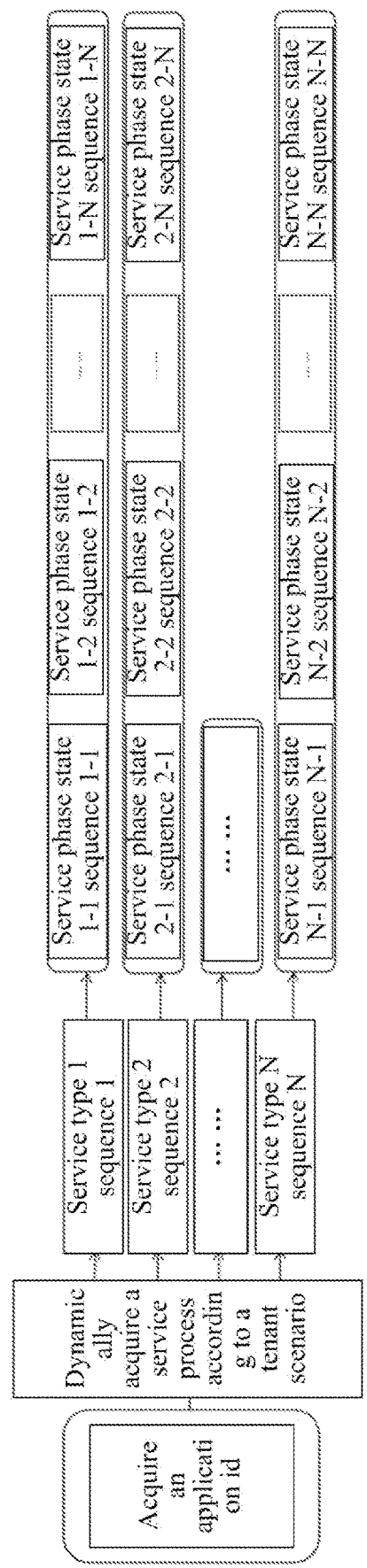
FIG. 7 is a model diagram of an application service scenario based service process in an embodiment of the present disclosure.

In conclusion, according to the technical solutions of the present disclosure, a multi-scenario application service process customization service is realized through one multi-scenario service process customization method. Moreover, the collaborative management system for application service process customization in a multi-tenant mode is offered, as shown in FIGS. 6 and 7. Accordingly, the multiple-scenario collaborative management is realized, the system flexibility is improved, and multi-tenant collaborative management and cross-application collaborative tenant management are realized.

Obviously, the above embodiments of the present disclosure are merely to illustratively describe the present disclosure more clearly, and are not intended to limit the implementations of the present disclosure. Different forms of changes made on the basis of the above description still fall within the scope of protection of the present disclosure.

It should be understood by those of ordinary skill in the art that the discussion of any embodiment above is merely illustrative and is not intended to imply that the scope of the present disclosure (including the claims) is limited to these examples. Within the concept of the present disclosure, the above embodiments or the technical features in different embodiments can also be combined with one another, the steps can be implemented in any sequence, and various other changes to different aspects of the present disclosure can be made, which are not provided in detail for the sake of brevity.

What is claimed is:

1. A collaborative application service process management system based on a multi-tenant mode, comprising:
   instructions adapted for storage on one or more non-transitory computer-readable mediums and execution on one or more processors, which instructions define an application module, an application service process phase module, an application service process phase state module, an application object module, a collaborative application object management module, an application permission module, an application service process re-combiner, and a shared database, wherein:
   the application module is configured to construct the tenant-application model and save a constructed tenant-application model as a form identifier WxappId into application data of the shared database;
   the application service process phase module is configured to design a multi-scenario service process model, process a service phase, construct the service phase and a service phase process instance, and save a designed service process phase as a form identifier SchedulesetId into the application data of the shared database;
   the application service process phase state module is configured to design a service phase state model, process a service phase state, construct the service phase state and a service phase state instance, and save a designed service phase state as a form identifier SchedulesetValueId into state data of the shared database;
   the application object module is configured to construct and manage a service object and save the service object as a form identifier Orderid into an application object table of the shared database;
   the collaborative application object management module is configured to collaboratively manage construction and change of the service object and service phase state data information, assign the service object and the service phase state data information in a form of a data set according to different service scenarios, and save the service object and the service phase state data information into different types of service data of the shared database;
   the application permission module is configured to manage a tenant-application relation and save tenant-application permission data into application-tenant relation data of the shared database, and further manage an inter-application relation and save inter-application permission data into application permission data of the shared database;

the application service process re-combiner is configured to acquire service phases and service phase state data in different scenarios from the shared database and output re-combined service phases and the service phase state data in a form of a data stream to a web end, and further acquire the service data of the acquired service phases and service phase states in the different scenarios from shared data and output re-combined service data in the form of the data stream to the web end; and the shared database is configured to store the application data, phase data, phase state data, the application-tenant relation data, object data, the application permission data, the acquired service data, and tenant data.

2. The collaborative application service process management system according to claim 1, wherein the application service process re-combiner is further configured to the acquired service phases according to a current application identifier, classify the acquired service phases according to a service phase type, and output application service names in sequence based on service sequencing.

3. The collaborative application service process management system according to claim 2, wherein the application service process re-combiner is further configured to acquire the service phases according to the current application identifier, classify the acquired service phases according to the service phase type, generate a service identifier sequence based on the service sequencing, acquire a phase state identifier corresponding to a phase identifier from the acquired service data of service phase identifiers in loops according to a service object identifier, acquire a phase state name by matching the phase state identifier, and re-combine the acquired data after the loops are ended to obtain the service object and current phase state information of each phase.

4. A collaborative application service process management method based on a multi-tenant mode, applied to the collaborative application service process management system according to claim 1 and comprising:

performing requirement analysis on a current application service process phase, constructing a service phase in a required service phase sequence, and saving the service phase in a form of a natural language into a shared database;

re-analyzing a possible phase state in the current application service process phase and saving a possible state result in the form of the natural language into shared data;

setting application-tenant permission and saving application-tenant operation permission in to the shared database after setting;

setting inter-application permission and opening data permission between applications, so that a tenant under the application has permission to inquire other unrelated applications and view object data through collaborative application object management; and re-combining a process and data of the constructed service phase through a service process re-combiner and a service data re-combiner respectively, so that a service process is customized and service data are monitored in different scenarios.

5. The collaborative application service process management method according to claim 4, wherein the service process re-combiner is further configured to acquire service phases according to a current application identifier, classify the acquired service phases according to a service phase type, and output application service names in sequence based on service sequencing.

6. The collaborative application service process management method according to claim 5, wherein the service process re-combiner is further configured to acquire the service phases according to the current application identifier, classify the acquired service phases according to the service phase type, generate a service identifier sequence based on the service sequencing, acquire a phase state identifier corresponding to a phase identifier from the service data of service phase identifiers in loops according to a service object identifier, acquire a phase state name by matching the acquired phase state identifier, and re-combine the acquired service data after the loops are ended to obtain a service object and current phase state information of each phase.

7. The collaborative application service process management method according to claim 4, wherein the performing requirement analysis on the current application service process phase, constructing the service phase in the required service phase sequence, and saving the constructed service phase in a form of the natural language into the shared database comprises:

describing a phase name in a suitable natural language according to an actual service when a service process phase is set and then selecting a suitable service phase type as required to construct the service phase.

8. The collaborative application service process management method according to claim 5, wherein the performing requirement analysis on the current application service process phase, constructing the service phase in the required service phase sequence, and saving the constructed service phase in the form of the natural language into a shared database comprises:

describing a phase name in a suitable natural language according to an actual service when a service process phase is set and then selecting a suitable service phase type as required to construct the service phase.

9. The collaborative application service process management method according to claim 6, wherein the performing requirement analysis on the current application service process phase, 15 constructing the service phase in the required service phase sequence, and saving the constructed service phase in the form of the natural language into the shared database comprises:

describing a phase name in a suitable natural language according to an actual service when a service process phase is set and then selecting a suitable service phase type as required to construct the service phase.

10. The collaborative application service process management method according to claim 4, wherein the re-analyzing the possible phase state in the current application service process phase and saving the possible state result in the form of the natural language into the shared data comprises:

describing a phase state name in a suitable natural language according to an actual phase state when a service phase state is set and then selecting a suitable phase state type as required to construct a service state.

11. The collaborative application service process management method according to claim 5, wherein the re-analyzing the possible phase state in the current application service process phase and saving the possible state result in the form of the natural language into the shared data comprises:

describing a phase state name in a suitable natural language according to an actual phase state when a service phase state is set and then selecting a suitable phase state type as required to construct a service state.

12. The collaborative application service process management method according to claim 6, wherein the re-analyzing the possible phase state in the current application service process phase and saving the possible state result in the form of the natural language into the shared data comprises:

describing a phase state name in a suitable natural language according to an actual phase state when a service phase state is set and then selecting a suitable phase state type as required to construct a service state.

13. The collaborative application service process management method according to claim 4, wherein the setting application-tenant permission and saving the application-tenant operation permission into the shared database after setting comprises:

assigning operation permission to other tenants as required to enable the tenants to cooperate with one another.

14. The collaborative application service process management method according to claim 5, wherein the setting application-tenant permission and the saving application-tenant operation permission into the shared database after setting comprises: assigning operation permission to other tenants as required to enable the tenants to cooperate with one another.

15. The collaborative application service process management method according to claim 6, wherein the setting application-tenant permission and saving the application-tenant operation permission into the shared database after setting comprises:

assigning operation permission to other tenants as required to enable the tenants to cooperate with one another.

* * * * *